(12) United States Patent
Nagatani et al.

(10) Patent No.: US 7,992,118 B2
(45) Date of Patent: Aug. 2, 2011

(54) SEMICONDUCTOR INTEGRATED CIRCUIT AND DESIGN METHOD FOR SEMICONDUCTOR INTEGRATED CIRCUIT

(75) Inventors: Takahiro Nagatani, Osaka (JP); Mitsuhiro Imaizumi, Osaka (JP)

(73) Assignee: Panasonic Corporation, Osaka (JP)

( * ) Notice: Subject to any disclaimer, the term of this patent is extended or adjusted under 35 U.S.C. 154(b) by 893 days.

(21) Appl. No.: 11/979,483

(22) Filed: Nov. 5, 2007

(65) Prior Publication Data

US 2008/0141186 A1    Jun. 12, 2008

(30) Foreign Application Priority Data

Dec. 8, 2006  (JP) .................................. 2006-331553

(51) Int. Cl.
*G06F 17/50* (2006.01)
*G06F 7/38* (2006.01)
*H03K 19/177* (2006.01)
*H01L 25/00* (2006.01)
*H03K 19/173* (2006.01)

(52) U.S. Cl. ............ 716/119; 716/139; 326/40; 326/41; 326/46; 326/47

(58) Field of Classification Search ..................... 716/11, 716/119, 139; 326/40, 41, 46, 47
See application file for complete search history.

(56) References Cited

U.S. PATENT DOCUMENTS

| | | | | |
|---|---|---|---|---|
| 5,959,905 | A * | 9/1999 | Payne | 365/200 |
| 7,383,523 | B2 * | 6/2008 | Inoue | 716/6 |
| 2004/0027863 | A1 | 2/2004 | Lee et al. | |
| 2006/0181307 | A1 * | 8/2006 | Shibayashi et al. | 326/41 |
| 2007/0157151 | A1 * | 7/2007 | Kim | 716/17 |
| 2008/0141207 | A1 * | 6/2008 | Nakamura | 716/14 |
| 2008/0237644 | A1 * | 10/2008 | Tripathi | 257/202 |
| 2008/0283872 | A1 * | 11/2008 | Kubo et al. | 257/209 |

FOREIGN PATENT DOCUMENTS

JP    2005-322694    11/2005

* cited by examiner

*Primary Examiner* — Suresh Memula
(74) *Attorney, Agent, or Firm* — McDermott Will & Emery LLP

(57) ABSTRACT

The semiconductor integrated circuit of the invention includes: two first power supply lines placed in parallel in a same interconnect layer; a second power supply line placed between the two first power supply lines in the same interconnect layer; an actual operation flipflop connected to one of the two first power supply lines and the second power supply line and having a first clock terminal; and a dummy flipflop connected to the other first power supply line and the second power supply line and having a second clock terminal. The dummy flipflop includes: a contact connected to the other first power supply line or the second power supply line; and an interconnect for connecting the second clock terminal with the contact.

5 Claims, 6 Drawing Sheets

SEMICONDUCTOR INTEGRATED CIRCUIT AND DESIGN METHOD FOR SEMICONDUCTOR INTEGRATED CIRCUIT

CROSS-REFERENCE TO RELATED APPLICATIONS

This application claims priority under 35 U.S.C. §119 on Patent Application No. 2006-331553 filed in Japan on Dec. 8, 2006, the entire contents of which are hereby incorporated by reference.

BACKGROUND OF THE INVENTION

The present invention relates to a semiconductor integrated circuit and a design method for the same, and more particularly, to circuit modifiability in the design stage.

In recent years, design rules of semiconductor integrated circuits have become finer and the semiconductor process technology has been more sophisticated. In this situation, the cost of masks used in a semiconductor process has risen. At the time of circuit modification, therefore, it has been requested to reduce the number of layers to be modified to a minimum so as to minimize the number of masks to be modified. At the time of modification for a clock system, it has been additionally requested to suppress a skew variation that may occur with the modification.

There are known methods for circuit modification in which an integrated circuit is provided in advance with a cell unnecessary for its original function (hereinafter, such a cell is called a dummy cell) in preparation for circuit modification. In the following two methods, a flipflop (FF) is used as a dummy cell for circuit modification (see Japanese Laid-Open Patent Publication No. 2005-322694, for example).

FIG. 13 is a circuit diagram of an example of a semiconductor integrated circuit using dummy cells. The circuit of FIG. 13 has dummy cells 34. Clock tree synthesis (CTS) is executed in advance in the state of having the dummy cells 34 connected in place of FF cells 35. Once a circuit modification involving addition of a FF cell becomes necessary, a dummy cell 34 is replaced with a FF cell 35.

The CTS as used herein refers to placing buffers at optimal positions in a buffer tree so that clock skew be minimized in the state of including dummy cells as well as flipflops required for the original function.

FIG. 14 is a circuit diagram of another example of a semiconductor integrated circuit using dummy cells. In FIG. 14, dummy FFs 37 are already placed at positions near dummy cells 36. Once a circuit modification involving addition of a dummy FF becomes necessary, an interconnect to a dummy cell 36 located near the position at which the circuit modification is necessary is cut off, and a dummy FF 37 located near the dummy cell 36 is connected in place of the disconnected dummy cell 36.

The semiconductor integrated circuits described above have the following problems. In the case of FIG. 13, which requires cell replacement, both a diffusion layer (lower layer) and an interconnect layer (upper layer) must be changed. This is therefore greatly disadvantageous in the aspects of cost (mask cost, etc.) and the development time.

In the case of FIG. 14, which requires rerouting of interconnects, a difference arises between the length of an interconnect to a dummy cell and the length of an interconnect to a reconnected dummy FF cell, and this may adversely affect clock skew. Also, since clock routing is often made in consideration of signal integrity, there are concerns that congestion may occur due to the rerouting and that signal integrity measures for the modified interconnect may be insufficient.

SUMMARY OF THE INVENTION

An object of the present invention is minimizing the number of layers that must be modified at the time of circuit modification in a semiconductor integrated circuit.

The semiconductor integrated circuit according to the present invention includes an actual operation flipflop and a dummy flipflop connected to power supply in parallel with the actual operation flip-flop.

Specifically, the semiconductor integrated circuit of the present invention includes: two first power supply lines placed in parallel in a same interconnect layer; a second power supply line placed between the two first power supply lines in the same interconnect layer as the first power supply lines; an actual operation flipflop connected to one of the two first power supply lines and the second power supply line, the actual operation flipflop having a first clock terminal; and a dummy flipflop connected to the other first power supply line and the second power supply line, the dummy flipflop having a second clock terminal. The dummy flipflop includes: a contact connected to the other first power supply line or the second power supply line; and an interconnect for connecting the second clock terminal with the contact, and is placed so that the distance between the first clock terminal and the second clock terminal in the direction of extension of the second power supply line is shorter than the length of the actual operation flipflop in the direction of extension of the second power supply line.

According to the semiconductor integrated circuit of the present invention, which is provided with the dummy flipflop connected to the first and second power supply lines, when a need for circuit modification arises, it is only required to make slight modification of interconnects, and no replacement of flipflop cells is necessary. It is therefore possible to reduce the number of layers that must be modified, suppress influences of the circuit modification on clock skew and crosstalk, suppress routing congestion, and implement signal integrity measures.

Alternatively, the semiconductor integrated circuit of the present invention includes: two first power supply lines placed in parallel in a same interconnect layer; a second power supply line placed between the two first power supply lines in the same interconnect layer as the first power supply lines; an actual operation flipflop connected to one of the two first power supply lines and the second power supply line, the actual operation flipflop having a first clock terminal; a dummy flipflop connected to the other first power supply line and the second power supply line, the dummy flipflop having a second clock terminal; and a circuit modification interconnect extending from the first clock terminal toward the second clock terminal. The dummy flipflop includes a contact connected to the other first power supply line or the second power supply line; and an interconnect for connecting the second clock terminal with the contact.

With the above configuration, which includes the circuit modification interconnect, the modification of interconnects required at circuit modification can be small. It is therefore possible to suppress influences of the circuit modification on clock skew.

DESCRIPTION OF THE PREFERRED EMBODIMENTS

Hereinafter, preferred embodiments of the present invention will be described with reference to the accompanying drawings.

Figure 1:
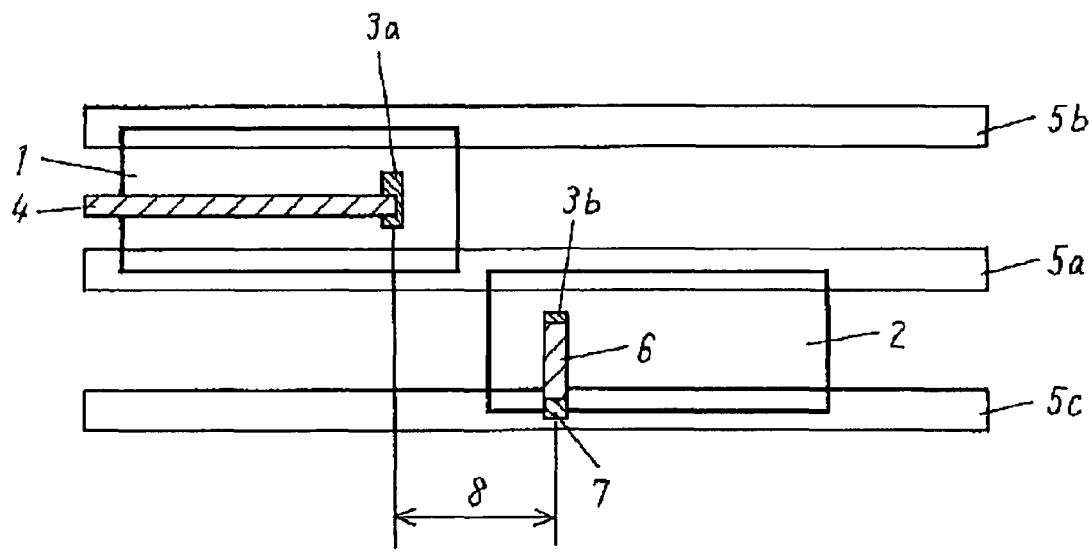
FIG. 1 is a layout diagram showing a first exemplary configuration of a semiconductor integrated circuit of an embodiment of the present invention.

FIG. 1 is a layout diagram showing a first exemplary configuration of a semiconductor integrated circuit of an embodiment of the present invention. The semiconductor integrated circuit of FIG. 1 includes a ground line 5a, power supply lines 5b and 5c, an actual operation FF 1, and a dummy FF 2. In FIG. 1, the two power supply lines 5b and 5c are placed in parallel with the ground line 5a running in the center therebetween. The actual operation FF 1 is connected to the ground line 5a and the power supply line 5b, while the dummy FF 2 is connected to the ground line 5a and the power supply line 5c. In the operation, the ground potential is provided to the ground line 5a while the positive power supply potential is provided to the power supply lines 5b, 5c.

The actual operation FF 1 has a clock terminal 3a. The dummy FF 2, which is a flipflop of the same type of the actual operation FF 1 and configured roughly equal to the actual operation FF 1, has a clock terminal 3b, an interconnect 6 and a contact 7. The dummy FF 2 is placed so that the distance 8 between the clock terminals 3a and 3b in the direction of extension of the ground line 5a is shorter than the length of the actual operation FF 1 in the direction of extension of the ground line 5a. A shorter distance 8 is more desirable.

The actual operation FF 1 is a FF cell that actually operates as part of the circuit, and the clock terminal 3a thereof is connected to an interconnect 4 for which CTS has been executed. The dummy FF 2 is a FF cell reserved for use when a need for circuit modification arises, and thus the clock terminal 3b thereof is connected to the power supply line 5c via the interconnect 6 and the contact 7. The interconnect 6 is preferably as short as possible. Although not shown in FIG. 1, any input terminal of the dummy FF 2 other than the clock terminal 3b should be connected to the power supply line 5c via a contact and an interconnect.

The clock terminal 3b and any other input terminal of the dummy FF 2 may otherwise be connected to the ground line 5a.

Although the two power supply lines 5b and 5c are placed in parallel with the ground line 5a running in the center therebetween in the illustrated example, two ground lines may be placed in parallel with a power supply line running in the center therebetween.

When there arises a need for circuit modification for additionally using the dummy FF 2, the circuit modification can be made with modification related to an interconnect between the clock terminals 3a and 3b and the interconnect 6. It is no more necessary to perform replacement of cells and, in relation to the clock signal, rerouting of interconnects other than these interconnects. It is therefore possible to reduce the number of interconnect layers that must be modified, suppress influences of the circuit modification on clock skew and crosstalk, suppress routing congestion, and implement signal integrity measures.

Figure 2:
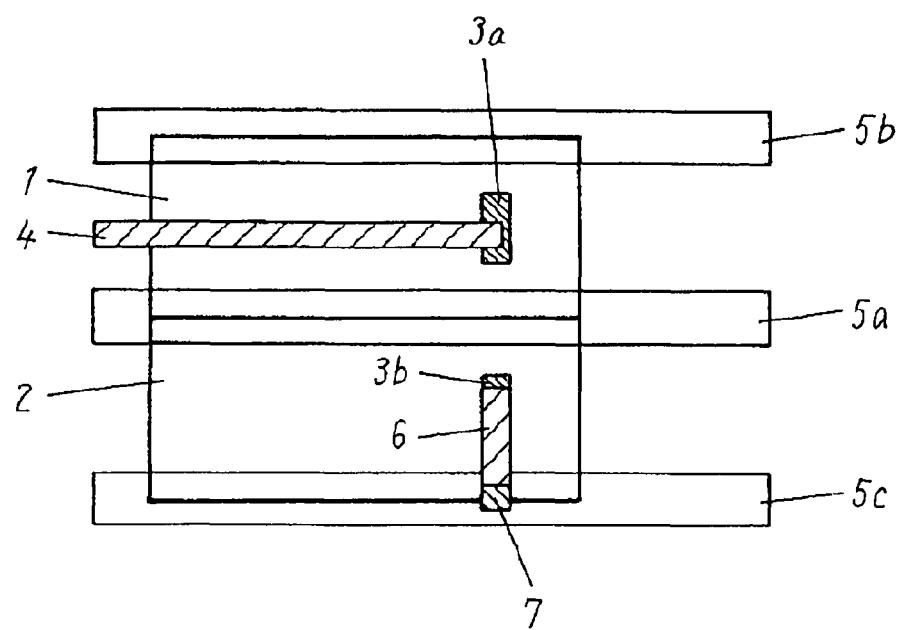
FIG. 2 is a layout diagram of an alteration to the semiconductor integrated circuit of FIG. 1.

FIG. 2 shows a layout diagram of an alteration to the semiconductor integrated circuit of FIG. 1. In FIG. 2, the actual operation FF 1 and the dummy FF 2 are placed so that the straight line connecting the clock terminal 3a of the actual operation FF 1 with the clock terminal 3b of the dummy FF 2 crosses the ground line 5a or the power supply line 5b or 5c at right angles. With this arrangement, when a need for circuit modification arises, an interconnect between the clock terminals 3a and 3b can be shortest, and thus a skew variation caused by the circuit modification can be suppressed.

Figure 3:
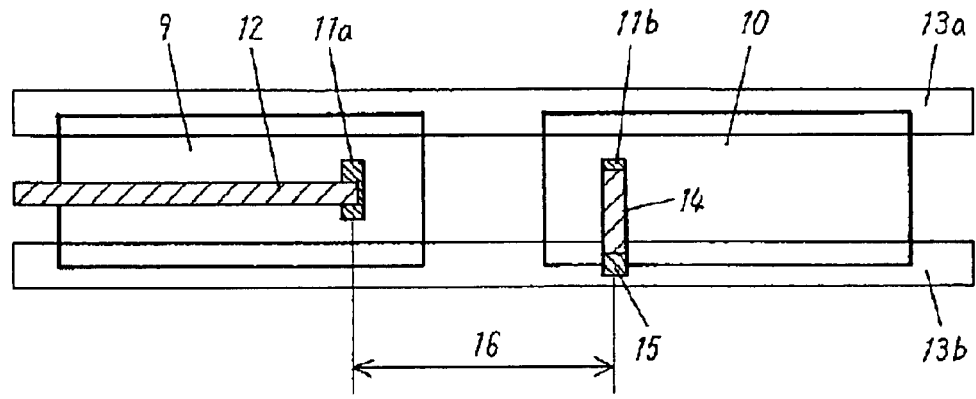
FIG. 3 is a layout diagram showing a second exemplary configuration of a semiconductor integrated circuit of an embodiment of the present invention.

FIG. 3 is a layout diagram showing a second exemplary configuration of a semiconductor integrated circuit of an embodiment of the present invention. The semiconductor integrated circuit of FIG. 3 includes a power supply line 13a, a ground line 13b, an actual operation FF 9 and a dummy FF 10. In FIG. 3, the power supply line 13a and the ground line 13b are placed in parallel. Both the actual operation FF 9 and the dummy FF 10 are connected to the power supply line 13a and the ground line 13b. In the operation, the positive power supply potential is provided to the power supply line 13a while the ground potential is provided to the ground line 13b.

The actual operation FF 9 has a clock terminal 11a. The dummy FF 10, which is a flipflop of the same type of the actual operation FF 9 and configured roughly equal to the actual operation FF 9, has a clock terminal 11b, an interconnect 14 and a contact 15. The dummy FF 10 is placed so that the distance 16 between the clock terminals 11a and 11b in the direction of extension of the ground line 13b is shorter than the length of the actual operation FF 9 in the direction of extension of the ground line 13b. A shorter distance 16 is more desirable.

The actual operation FF 9 is a FF cell that actually operates as part of the circuit, and the clock terminal 11a thereof is connected with an interconnect 12 for which CTS has been executed. The dummy FF 10 is a FF cell reserved for use when a need for circuit modification arises, and thus the clock terminal 11b thereof is connected to the ground line 13b via the interconnect 14 and the contact 15. The interconnect 14 is preferably as short as possible. Although not shown in FIG. 3, any input terminal of the dummy FF 10 other than the clock terminal 11b should be connected to the ground line 13b via a contact and an interconnect.

The clock terminal 11b and any other input terminal of the dummy FF 10 may otherwise be connected to the power supply line 13a.

In FIG. 3, the power supply line 13a and the ground line 13b may be interchanged.

Figure 4:
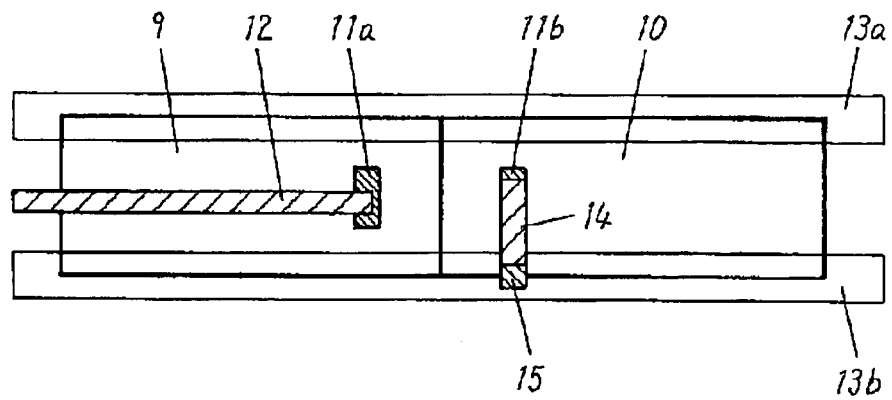
FIG. 4 is a layout diagram of an alteration to the semiconductor integrated circuit of FIG. 3.

FIG. 4 shows a layout diagram of an alteration to the semiconductor integrated circuit of FIG. 3. In FIG. 4, the actual operation FF 9 and the dummy FF 10 are placed so as to be adjacent to each other. With this arrangement, when a need for circuit modification arises, an interconnect between the clock terminal 11a of the actual operation FF 9 and the clock terminal 11b of the dummy FF 10 can be shortest, and thus a skew variation caused by the circuit modification can be suppressed.

Figure 5:
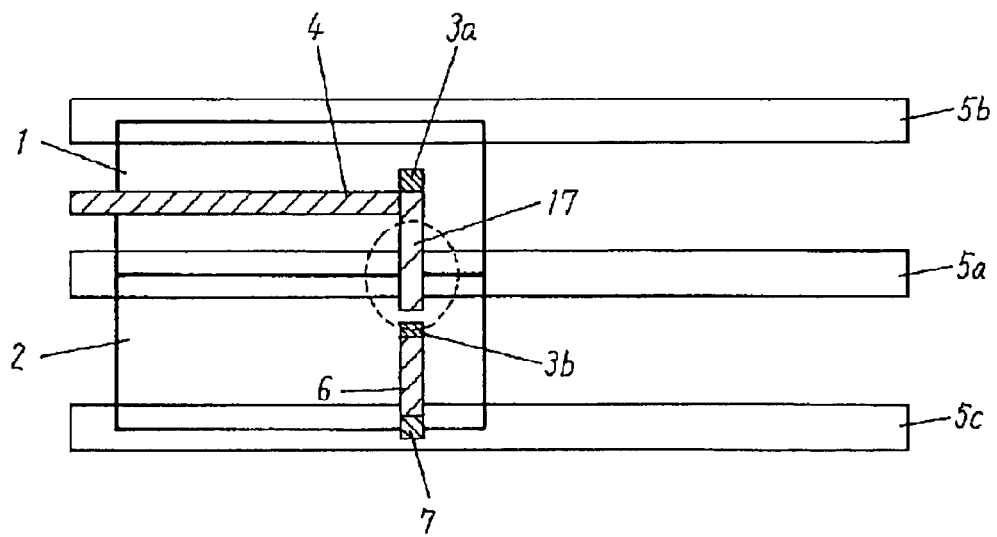
FIG. 5 is a layout diagram of a semiconductor integrated circuit having a circuit modification interconnect in addition to the components of the semiconductor integrated circuit of FIG. 2.
Figure 6:
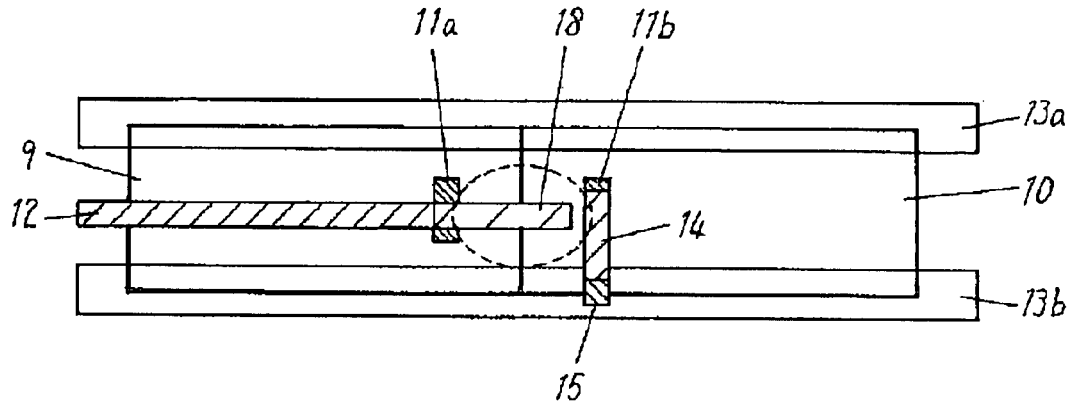
FIG. 6 is a layout diagram of a semiconductor integrated circuit having a circuit modification interconnect in addition to the components of the semiconductor integrated circuit of FIG. 4.

FIG. 5 is a layout diagram of a semiconductor integrated circuit in which a circuit modification interconnect is provided in addition to the components of the semiconductor integrated circuit of FIG. 2. FIG. 6 is a layout diagram of a semiconductor integrated circuit in which a circuit modification interconnect is provided in addition to the components of the semiconductor integrated circuit of FIG. 4.

The semiconductor integrated circuits of FIGS. 5 and 6 have circuit modification interconnects 17 and 18, respectively, in addition to the components of the semiconductor integrated circuits of FIGS. 2 and 4. The circuit modification interconnects 17 and 18 are formed in advance in a region in which interconnect modification is to be made (inside the dotted circle in FIGS. 5 and 6) in the same layer as an interconnects to be modified.

More specifically, in the semiconductor integrated circuit of FIG. 5, the circuit modification interconnect 17 extends from the clock terminal 3a of the actual operation FF 1 toward the clock terminal 3b of the dummy FF 2. Likewise, in the semiconductor integrated circuit of FIG. 6, the circuit modification interconnect 18 extends from the clock terminal 11a toward the clock terminal 11b.

With the above arrangement, circuit modification for additionally using the dummy FF 2, or for additionally using the dummy FF 10, can be achieved by only modifying a miniscule portion. Also, since the wiring capacity little changes, a skew variation that may occur due to the modification can be suppressed. Moreover, since the circuit modification interconnect is formed in advance, it is possible to prevent another interconnect from being placed at the position where the circuit modification interconnect should be placed.

Hereinafter, an example of circuit modification will be described. The entire of the following circuit modification is to be executed by a design apparatus in the design stage for a semiconductor integrated circuit. Such a design apparatus, provided with a normal computer, performs circuit modification by allowing the computer to execute computer-aided design (CAD) software having a function of generating mask pattern data. A mask is formed from this data, and using the mask, a semiconductor integrated circuit is fabricated.

Figure 7:
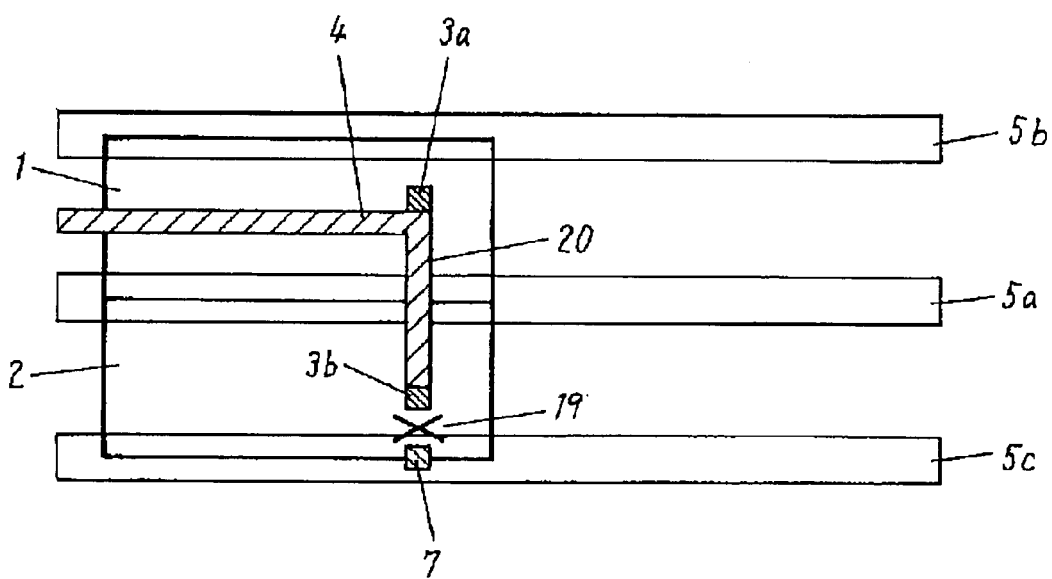
FIG. 7 is a layout diagram showing an example of circuit modification for the semiconductor integrated circuit of FIG. 2.

FIG. 7 is a layout diagram showing an example of circuit modification for the semiconductor integrated circuit of FIG. 2. If there arises a need for circuit modification to use the dummy FF 2 in the semiconductor integrated circuit of FIG. 2, the circuit modification is performed in the following manner. That is, after placement of the semiconductor integrated circuit of FIG. 2, the interconnect 6 connecting the clock terminal 3b of the dummy FF 2 with the contact 7 is removed (location 19 in FIG. 7), and a new interconnect 20 is placed to connect the clock terminal 3a of the actual operation FF 1 with the clock terminal 3b of the dummy FF 2.

With the above arrangement, replacement of cells and rerouting of interconnects are no more necessary, and circuit modification can be achieved only with interconnect modification in a limited range. For the other semiconductor integrated circuits such as that of FIG. 4, also, circuit modification can be made in a similar manner. That is, after placement of the semiconductor integrated circuit of FIG. 4, the interconnect 14 connecting the clock terminal 11b of the dummy FF 10 with the contact 15 is removed, and a new interconnect is placed to connect the clock terminal 11a of the actual operation FF 9 with the clock terminal 11b of the dummy FF 10.

In the case that the circuit modification interconnect 17, 18 already extends from the clock terminal 3a, 11a of the actual operation FF 1, 9 toward the clock terminal 3b, 11b of the dummy FF 2, 10 as in FIGS. 5 and 6, the circuit modification is made in the following manner. That is, after placement of the semiconductor integrated circuit of FIG. 5 or FIG. 6, the interconnect 6 or the interconnect 14 is removed. Then, connection is made between the circuit modification interconnect 17 and the clock terminal 3b of the dummy FF 2, or between the circuit modification interconnect 18 and the clock terminal 11b of the dummy FF 10, by placing a new interconnect, not by connecting between the clock terminals via the interconnect 20.

Figure 8:
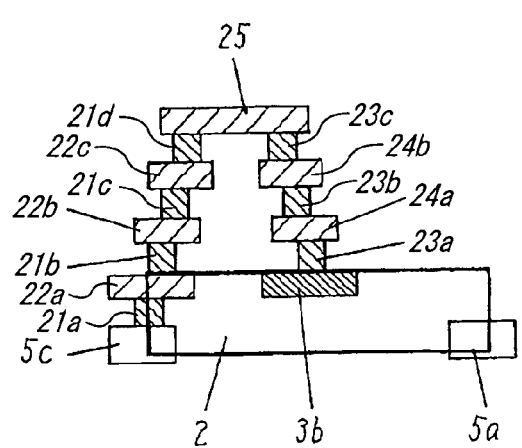
FIG. 8 is a cross-sectional view of another alteration to the semiconductor integrated circuit of FIG. 1.

FIG. 8 is a cross-sectional view of another alteration to the semiconductor integrated circuit of FIG. 1, taken in a plane vertical to the ground line 5a. The semiconductor integrated circuit of FIG. 8 is different from that of FIG. 1 in that contacts 21a, 21b, 21c and 21d and interconnects 22a, 22b and 22c for first stack, contacts 23a, 23b and 23c and interconnects 24a and 24b for second stack, and an interconnect 25 for connection are provided in place of the interconnect 6 and the contact 7.

As shown in FIG. 8, the first-stack interconnects 22a to 22c are stacked alternately with the first-stack contacts 21a to 21d on the power supply line 5c. Likewise, the second-stack interconnects 24a and 24b are stacked alternately with the second-stack contacts 23a to 23c on the clock terminal 3b of the dummy FF 2.

The first-stack contacts 21a to 21d and the first-stack interconnects 22a to 22c constitute a first multilayer group, and the second-stack contacts 23a to 23c and the second-stack interconnects 24a and 24b constitute a second multilayer group. The first and second multilayer groups reach the same level of layer where they are connected to each other via the interconnect 25, which constitutes a top-level interconnect layer, for example.

The numbers of interconnect layers in the first and second multilayer groups may be arbitrary, but the maximum numbers depend on the process. With the above arrangement, once a need for circuit modification arises, connection between the power supply line 5c and the clock terminal 3b of the dummy FF 2 can be cut off at any given layer.

Although the first multilayer group was formed on the power supply line 5c, it may otherwise be formed on the ground line 5a.

Figure 9:
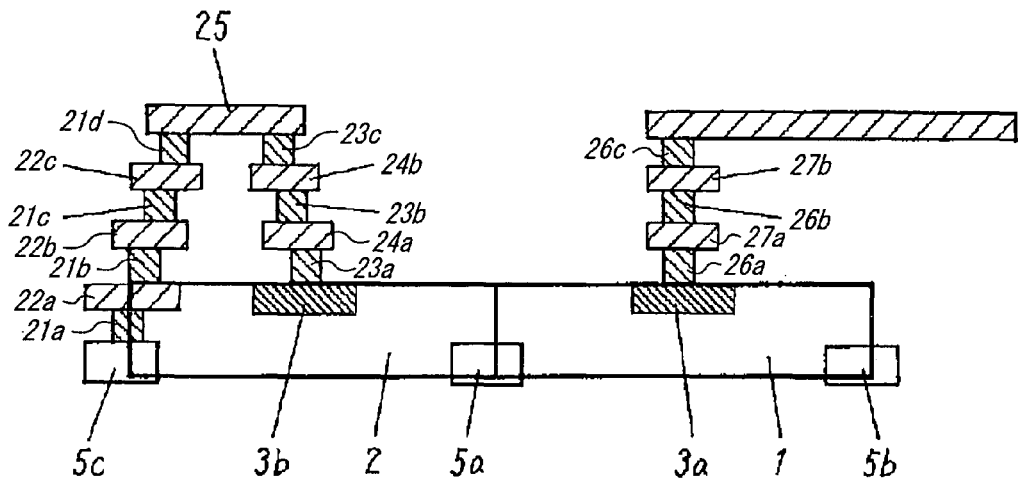
FIG. 9 is a cross-sectional view of another alteration to the semiconductor integrated circuit of FIG. 2.

FIG. 9 is a cross-sectional view of an alteration to the semiconductor integrated circuit of FIG. 2, taken in a plane vertical to the ground line 5a. The semiconductor integrated circuit of FIG. 9 is different from that of FIG. 2 in that contacts 21a to 21d and interconnects 22a to 22c for first stack, contacts 23a to 23c and interconnects 24a and 24b for second stack, and an interconnect 25 for connection are provided in place of the interconnect 6 and the contact 7, and further contacts 26a, 26b and 26c and interconnects 27a and 27b for third stack are provided.

As shown in FIG. 9, the third-stack interconnects 27a and 27b are stacked alternately with the third-stack contacts 26a to 26c on the clock terminal 3a of the actual operation FF 1. The third-stack contacts 26a to 26c and the third-stack interconnects 27a and 27b constitute a third multilayer group, which reaches the same level of layer as the first and second multilayer groups. Description of the same components as those in FIG. 8 is omitted here.

Figure 10:
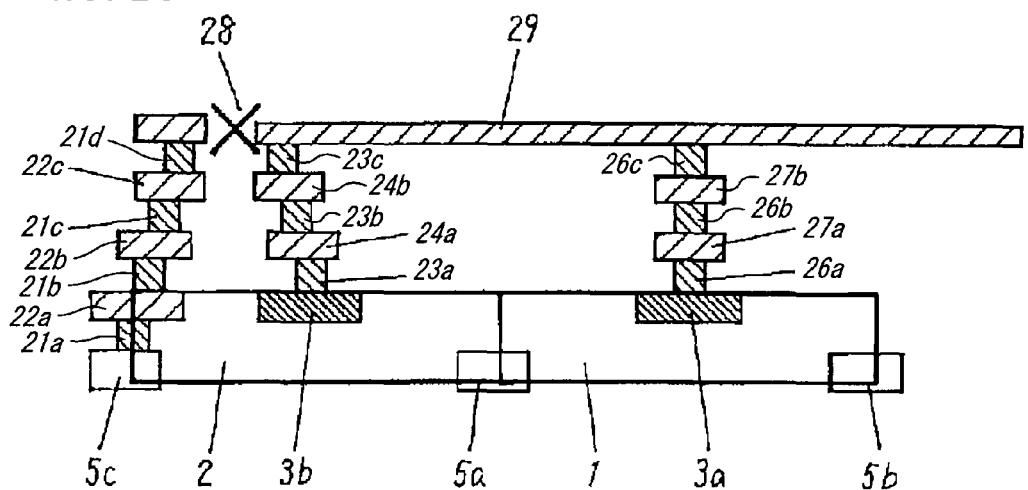
FIG. 10 is a cross-sectional view showing an example of circuit modification for the semiconductor integrated circuit of FIG. 9.

FIG. 10 is a cross-sectional view showing an example of circuit modification for the semiconductor integrated circuit of FIG. 9. If there arises a need for circuit modification to use the dummy FF 2, circuit modification is performed in the following manner. That is, as shown in FIG. 10, after placement of the semiconductor integrated circuit of FIG. 9, a portion of the interconnect 25 indicated by location 28 is removed, and an interconnect 29 is placed to connect the second multilayer group with the third multilayer group. The interconnect 29 is formed in the same layer as the interconnect 25.

Figure 11:
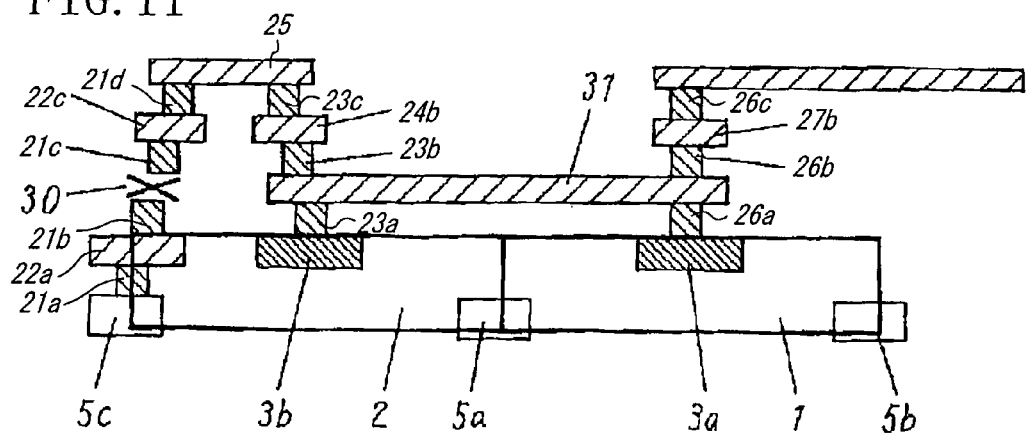
FIG. 11 is a cross-sectional view showing another example of circuit modification for the semiconductor integrated circuit of FIG. 9.

FIG. 11 is a cross-sectional view showing another example of circuit modification for the semiconductor integrated circuit of FIG. 9. If there arises a need for circuit modification to use the dummy FF 2, circuit modification is performed in the following manner.

As shown in FIG. 11, after placement of the semiconductor integrated circuit of FIG. 9, the first-stack interconnect 22b in FIG. 9 is removed, as indicated by location 30. The second-stack interconnect 24a and the third-stack interconnect 27a, both located in the same layer as the first-stack interconnect 22b, are then removed, and in place of these interconnects, an interconnect 31 for connection is placed in the same layer. The interconnect 31 connects the clock terminal 3a with the clock terminal 3b via the second-stack contact 23a and the third-stack contact 26a.

With the circuit modification as shown in FIG. 11, if a need for circuit modification arises, interconnects can be modified in any one layer of the second and third multilayer groups.

Note that the semiconductor integrated circuits of FIGS. 2 to 6 may be configured like that of FIG. 8, and the semiconductor integrated circuit of FIG. 5 may be configured like that of FIG. 9.

Figure 12:
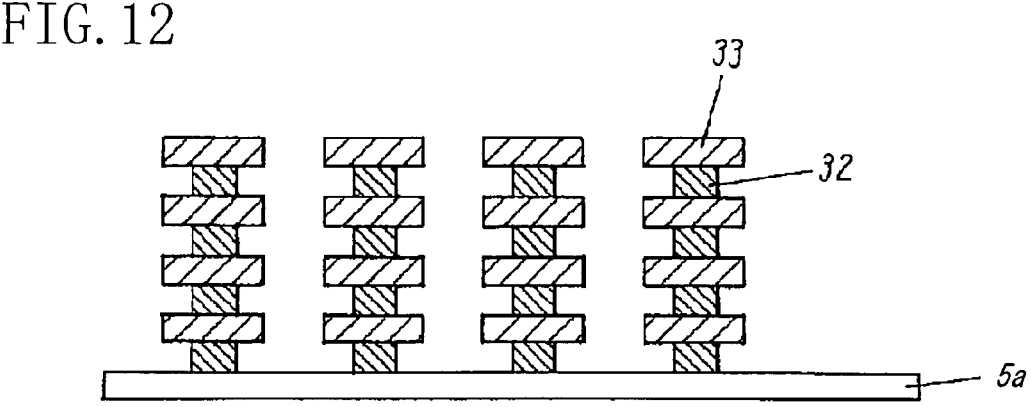
FIG. 12 is a cross-sectional view of yet another alteration to the semiconductor integrated circuit of FIG. 1.
Figure 13:
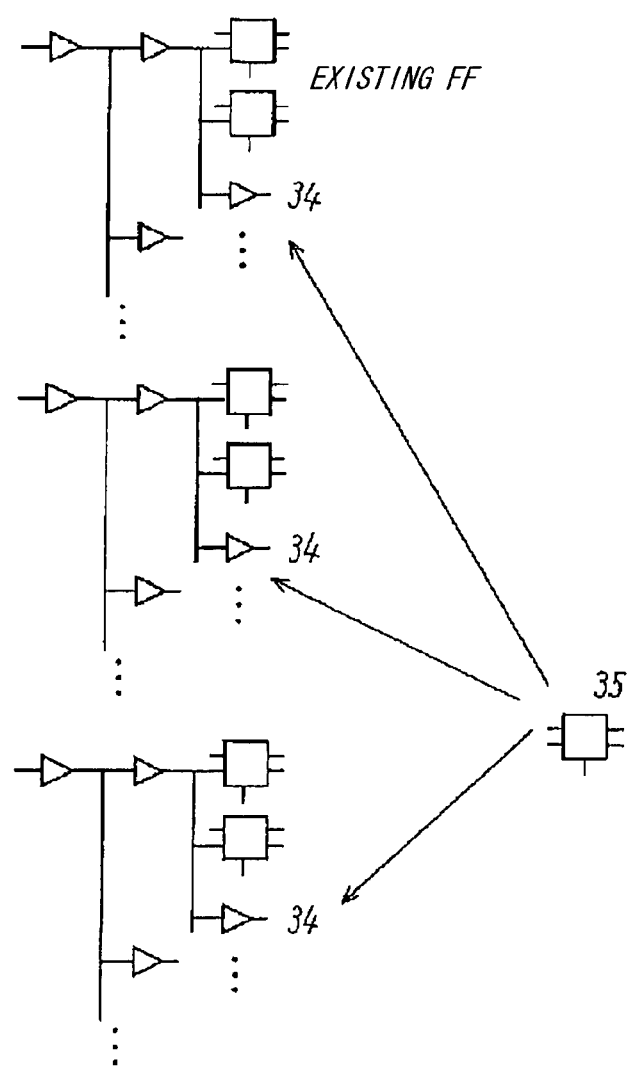
FIG. 13 is a circuit diagram of an example of a semiconductor integrated circuit using dummy cells.
Figure 14:
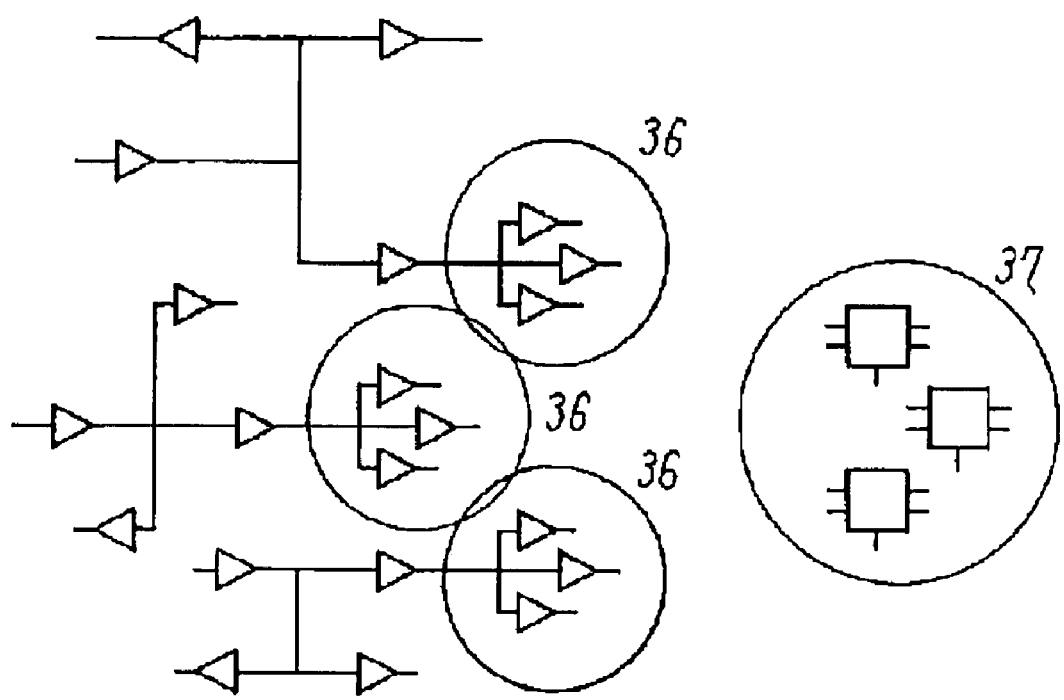
FIG. 14 is a circuit diagram of another example of a semiconductor integrated circuit using dummy cells.

FIG. 12 is a cross-sectional view of yet another alteration to the semiconductor integrated circuit of FIG. 1, taken in a plane parallel with the ground line 5a. The semiconductor integrated circuit of FIG. 12 further includes a plurality of contacts 32 for stack and a plurality of interconnects 33 for stack, in addition to the components of the semiconductor integrated circuit of FIG. 1. As shown in FIG. 12, the plurality of stack interconnects 33 are stacked alternately with the plurality of stack contacts 32 on the ground line 5a, constituting multilayer groups.

The number of layers of the stack interconnects 33 depends on the process. In FIG. 12, the case of five interconnect layers is shown as an example. Although the plurality of multilayer groups are formed on the ground line 5a in FIG. 12, they may be formed on the power supply line 5b or 5c.

If a logic cell (including a FF) becomes unnecessary, it is required to fix the input voltage. By previously forming multilayer groups as in FIG. 12, modification for fixing the logic cell input voltage can be achieved by only modifying one interconnect layer.

Note that the semiconductor integrated circuits of FIGS. 2 to 6 may be configured like that of FIG. 12.

As described above, according to the present invention, when a need for circuit modification arises during design of a semiconductor integrated circuit, the number of interconnect layers that must be modified can be reduced. Also, a skew variation is less likely to occur, and thus the layout of the circuit can be modified without degrading the performance thereof.

While the present invention has been described in preferred embodiments, it will be apparent to those skilled in the art that the disclosed invention may be modified in numerous ways and may assume many embodiments other than those specifically set out and described above. Accordingly, it is intended by the appended claims to cover all modifications of the invention which fall within the true spirit and scope of the invention.

What is claimed is:

1. A semiconductor integrated circuit comprising:
   a power supply line;
   a ground line placed in a same interconnect layer as the power supply line;
   an actual operation flipflop connected to the power supply line and the ground line, the actual operation flipflop having a first clock terminal; and
   a dummy flipflop connected to the power supply line and the ground line, the dummy flipflop having a second clock terminal,
   wherein the dummy flipflop comprises:
   a contact connected to the power supply line or the ground line; and
   an interconnect for connecting the second clock terminal with the contact, and
   is placed so that the distance between the first clock terminal and the second clock terminal in the direction of extension of the ground line is shorter than the length of the actual operation flipflop in the direction of extension of the ground line.

2. The circuit of claim 1, wherein the actual operation flipflop and the dummy flipflop are adjacent to each other.

3. The circuit of claim 1, further comprising a circuit modification interconnect extending from the first clock terminal toward the second clock terminal.

4. The circuit of claim 1, further comprising:
   at least one contact for first stack;
   at least one interconnect for first stack stacked alternately with the at least one contact for first stack on the power supply line or the ground line;
   at least one contact for second stack;
   at least one interconnect for second stack stacked alternately with the at least one contact for second stack on the second clock terminal; and
   an interconnect for connecting one of the at least one contact for first stack with one of the at least one contact for second stack, both the contacts being placed in a same layer.

5. The circuit of claim 1, further comprising:
   at least one contact for stack; and
   at least one interconnect for stack stacked alternately with the at least one contact for stack on the power supply line or the ground line.

* * * * *